(12) United States Patent
Gomes

(10) Patent No.: US 10,255,171 B2
(45) Date of Patent: *Apr. 9, 2019

(54) TEST METHODOLOGY FOR DETECTION OF UNWANTED CRYPTOGRAPHIC KEY DESTRUCTION

(71) Applicant: International Business Machines Corporation, Armonk, NY (US)

(72) Inventor: Louis P. Gomes, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/806,372

(22) Filed: Nov. 8, 2017

(65) Prior Publication Data

US 2019/0018763 A1 Jan. 17, 2019

Related U.S. Application Data

(63) Continuation of application No. 15/649,694, filed on Jul. 14, 2017.

(51) Int. Cl.
*G06F 11/36* (2006.01)

(52) U.S. Cl.
CPC ...... *G06F 11/3684* (2013.01); *G06F 11/3688* (2013.01)

(58) Field of Classification Search
None
See application file for complete search history.

(56) References Cited

U.S. PATENT DOCUMENTS

| 5,222,137 | A  | * | 6/1993  | Barrett   | H04L 9/0894  |
|           |    |   |         |           | 380/271      |
| 6,845,450 | B1 | * | 1/2005  | Kobayashi | H04L 9/0897  |
|           |    |   |         |           | 380/201      |
| 7,668,313 | B2 | * | 2/2010  | Nave      | G11B 20/00086|
|           |    |   |         |           | 380/259      |
| 8,059,814 | B1 | * | 11/2011 | Duane     | H04L 9/0869  |
|           |    |   |         |           | 380/281      |

(Continued)

OTHER PUBLICATIONS

Townsend, "The Definitive Guide to Encryption Key Management Fundamentals", 2016, Townsend Security (Year: 2016).*

(Continued)

*Primary Examiner* — Hossain M Morshed
(74) *Attorney, Agent, or Firm* — David B. Woycechowsky

(57) ABSTRACT

A test program is run repeatedly (either as a loop that is programmed into the code of the test program itself, or by repeatedly running the test program manually in response to user input instructing repeated run(s) of the test program. At least some run(s) of the test program use a cipher key that was derived and saved by the test program during a previous run of the test program (rather than re-deriving the cipher key based on information provided by the operating system). In this way, if the corresponding cipher key, as stored in the system space of the operating system has become corrupted during previous run(s) of the test program, then the incompatibility between the corrupted cipher key in the system space, and the previously saved cipher key that was previously derived by the test program, will be more easily detected.

6 Claims, 4 Drawing Sheets

(56) References Cited

U.S. PATENT DOCUMENTS

| | | | | | |
|---|---|---|---|---|---|
| 8,918,651 | B2* | 12/2014 | Greco | ...................... | G06F 21/80 380/277 |
| 9,251,338 | B2* | 2/2016 | Dayka | ...................... | G06F 21/53 |
| 9,467,288 | B2* | 10/2016 | Obukhov | ............. | G06F 21/6209 |
| 9,571,278 | B1* | 2/2017 | Harwood | .............. | H04L 9/0894 |
| 2009/0245507 | A1* | 10/2009 | Vuillaume | ................ | G06F 7/72 380/28 |
| 2012/0148047 | A1* | 6/2012 | Trimmer | ................. | G06F 21/64 380/277 |
| 2016/0149879 | A1* | 5/2016 | Haynes | ................. | H04L 63/067 713/170 |

OTHER PUBLICATIONS

Townsend, "The Definitive Guide to Encryption Key Management Fundamentals", Published by Townsend Security (Year: 2016), 35 pages.

Gomes, Louis P., "Test Methodology for Detection of Unwanted Cryptographic Key Destruction", U.S. Appl. No. 15/895,082, filed Feb. 13, 2018.

List of IBM Patents or Patent Applications Treated as Related, Filed Feb. 13, 2018, 2 pages.

List of IBM Patents or Patent Applications Treated as Related, Filed Nov. 8, 2017, 2 pages.

"Executable Integrity Verification", An IP.com Prior Art Database Technical Disclosure, Authors et. al.: Disclosed Anonymously, IP.com No. IPCOM000205271 D, IP.com Electronic Publication Date: Mar. 23, 2011, 9 pages.

"Method and System for Automatic Variation of Parameters Associated With Test Cases", An IP.com Prior Art Database Technical Disclosure, Authors et. al.: Disclosed Anonymously, IP.com No. IPCOM000201814D, IP.com Electronic Publication Date: Nov. 23, 2010, 3 pages.

Barker et al., "A Framework for Designing Cryptographic Key Management Systems", NIST Special Publication 800-130, Aug. 2013, 120 pages.

Gomes et al., "Test Methodology for Detection of Unwanted Cryptographic Key Destruction", U.S. Appl. No. 15/649,694, filed Jul. 14, 2017, 29 pages.

IBM, "System for re-use of existing automated functional verification testing for accessibility testing", An IP.com Prior Art Database Technical Disclosure, Original Publication Date: Jan. 21, 2009, IP.com No. IPCOM000178273D, IP.com Electronic Publication Date: Jan. 21, 2009, 3 pages.

* cited by examiner

TEST METHODOLOGY FOR DETECTION OF UNWANTED CRYPTOGRAPHIC KEY DESTRUCTION

BACKGROUND

The present invention relates generally to the field of software testing, and more particularly to software testing of computer code that includes the use of cryptographic encrypted keys where a set of key(s) in a public space is derived from a set of key(s) stored in a system space.

Software testing is an investigation conducted to provide stakeholders with information about the quality of the product or service under test. Software testing can also provide an objective, independent view of the software to allow the business to appreciate and understand the risks of software implementation. Test techniques include the process of executing a program or application with the intent of finding software bugs (errors or other defects), and verifying that the software product is fit for use. In software testing, it is known to use a "test program" that generates multiple "test streams." A test stream is an instance of a run of a test program (or an instance of a loop of a test program coded to loop through multiple runs of the testing code and instructions in a single run of the test program).

Some test programs run in a computing environment that includes a "system space" and a "test program space." As the term in used herein, a system space is a portion of memory and/or persistent storage that is allocated to store system information (for example, the memory and/or persistent storage to save the current master keys); outside entities like the operating system or test program do not have direct access to the system space. It is noted that a "system space" is typically different than an "operating system space," which is a portion of memory and/or persistent storage that is allocated to running of the operating system of a computer system (for example, the memory and/or persistent storage to run a mainframe computer operating system on a mainframe computer system). As the term in used herein, a test program space is a portion of memory and/or persistent storage that is allocated to running of test program(s) running on the computer system. Programs running in the program space typically get important information and/or data from the system space and communicate through the operating system running in the system space when accessing the data processing hardware of the computer.

A cryptographic key (sometimes herein more simply referred to as a "key" or "cipher key") is a piece of information (a parameter) that determines the functional output of an algorithm that encrypts and/or decrypts data (for example, transforms plaintext into ciphertext and/or vice versa, digital signature schemes, message authentication codes, etc.). Keys are generated to be used with a given set of algorithms, called a cryptosystem. Cryptography typically addresses security concerns, such as confidence about who signed a given document, or who replies at the other side of a data communication connection. Assuming that keys are not compromised, this involves determination of the owner of an applicable public key. Test programs that are designed to deal with encrypted data, of course, typically use keys. Sometimes keys are "destroyed" (that is, unlinked and/or written over in memory and/or storage). Sometimes this destruction of a key is a good thing, from a security perspective, such as when the key is no longer needed and/or has been superseded by a new set of key(s). However, if a key is destroyed when it is still needed for proper operation of a program then destruction of the key is considered an error (see definition of "error," below in the Definitions sub-section).

In test programs that use cryptography and keys, the test program will typically: (i) receive information relating to a set of master key(s) that exists in the system space; and (ii) use that information to derive a corresponding set of subsidiary key(s) in the program space of the test program. In this way, encrypted information can be used when the test program communicates with the system (that is, the low level functions of the processor(s) set)—that is, the corresponding sets of master and subsidiary key(s) can be used to encrypt and decrypt data as necessary and appropriate to the running of the test program.

A set of key(s) may include only a single key. However, in many applications, a set of key(s) include: (i) a "clear" version of a key (that is, an unencrypted version of a key); (ii) an encrypted version of the same key; and (iii) a wrapping key (that is, a key used to decrypt the encrypted version of the key into the clear version of the key.

PCKMO (Perform Cryptographic Key Management Operations) instruction is a known type of computer instruction that performs the following function: (i) it takes the DES (Data Encryption Standard) clear key of selected predefined length as input from the test program, generates the encrypted version of the DES clear key using the DES wrapping key, and returns the encrypted version of the DES clear key as the output to the test program; or (ii) it takes the AES (Advanced Encryption Standard) clear key of selected predefined length as input from the test program, generates the encrypted version of the AES clear key using the AES wrapping key, and returns the encrypted version of the AES clear key as the output to the test program. Thus, these functions allow the test program to create the encrypted version of the AES clear key without knowing the actual wrapping key that resides in the system space and is not known to the test program. As long as the current wrapping keys do not change, performing the one of the above function repeatedly with the same clear key would produce the same encrypted version of the clear key. Therefore, these machine functions offer the test program a means to obtain a clear key from an encrypted key without knowing the wrapping key and vice versa.

For the encrypted operation, the test program typically provides the encrypted DES/AES key instead of the clear DES/AES key. This is done to hide the clear key from a rogue program or a hacker that may be inspecting the crypto messages. However, only the clear key can be used to encrypt the input message. Thus, the encrypted key in the input message must be decrypted using the current wrapping key to get the clear version of the encrypted key and then use the clear version of the encrypted key to finally encrypt the input message.

SUMMARY

According to an aspect of the present invention, there is a computer-implemented method, computer program product and/or computer system that performs the following operations (not necessarily in the following order): (i) running, for a first time, a test program on a computer system, with the test program using instructions and data stored in a test program space of the computer system, with the running, for the first time, of the test program including: (a) receiving cipher key derivation data from a system space of the computer system, (b) deriving and storing in the test program space a set of subsidiary cipher key(s) based upon the cipher key derivation data, and (c) performing a set of data encrypted data communication(s) between the test program space and the system space co-operatively using the set of subsidiary cipher key(s) stored in the test program space and a set of master cipher key(s) stored in the system space; (ii) during or subsequent to the running for the first time of the test program, performing an operation that erroneously destroys the set of master cipher key(s) stored in the system space to yield a set of corrupted master cipher key(s) in the system space; and (iii) subsequent to the performance of the operation that erroneously destroys the set of master key(s) stored in the system space, running, for a second time, the test program on the computer system, with the running, for the second time, of the test program including: (a) receiving, in the test program space, the set of subsidiary cipher key(s) previously derived during the running, for the first time, of the test program, (b) encountering an error when attempting to perform a set of data encrypted data communication(s) between the test program space and the system space co-operatively using the set of subsidiary cipher key(s) received in the test program space and the set of corrupted master cipher key(s) stored in the system space, and (c) logging log data indicative of the error.

DETAILED DESCRIPTION

Figure 1:
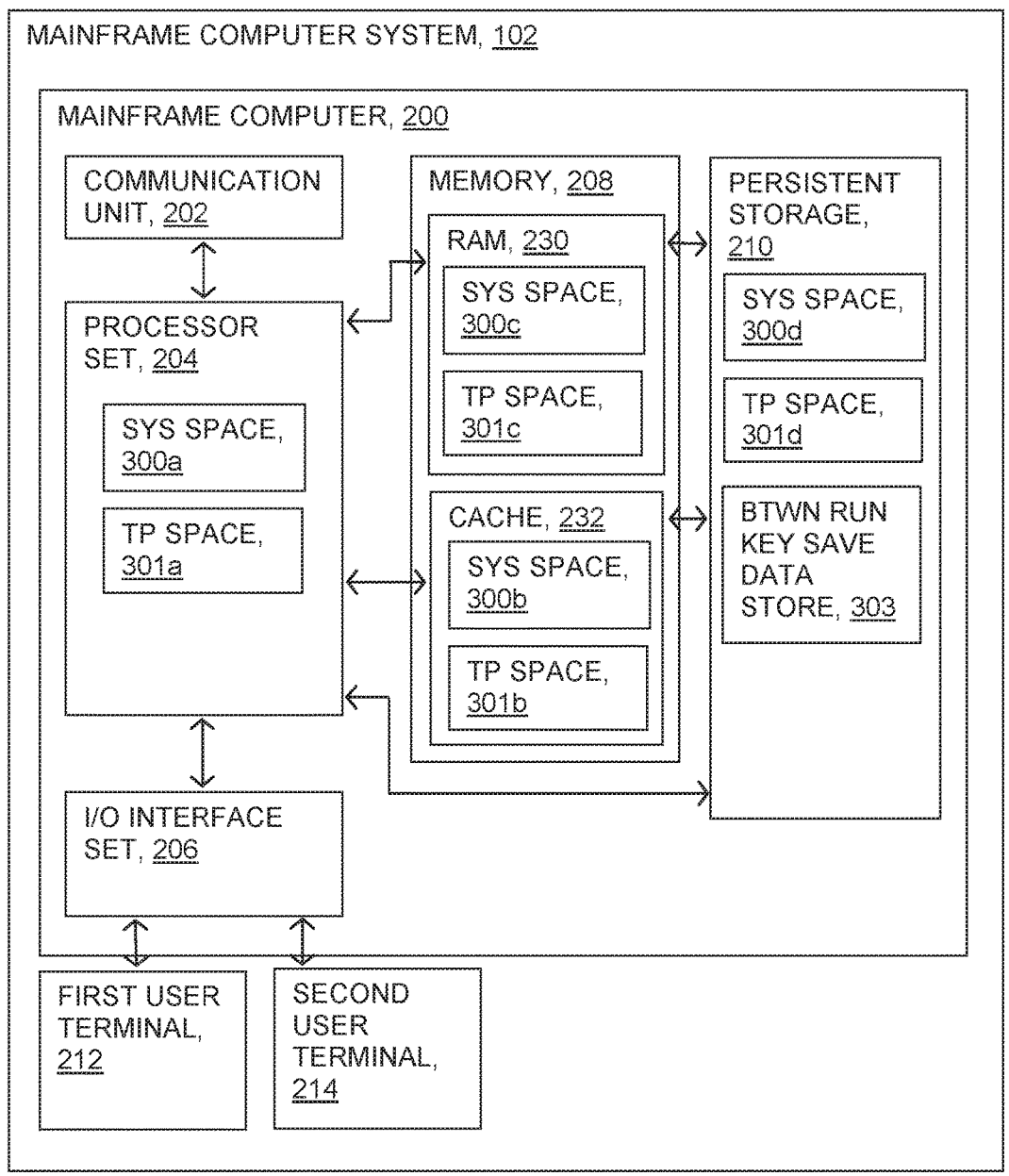
FIG. 1 is a block diagram view of a first embodiment of a system according to the present invention.

In some embodiments of the present invention: (i) a test program is run repeatedly (either as a loop that is programmed into the code of the test program itself, or by repeatedly running the test program manually in response to user input instructing repeated run(s) of the test program; and (ii) at least some run(s) of the test program use a cipher key that was derived and saved by the test program during a previous run of the test program (rather than re-deriving the cipher key based on information provided by the system). In this way, if the corresponding cipher key, as stored in the system space of the machine has become corrupted during previous run(s) of the test program, then the incompatibility between the corrupted cipher key in the system space, and the previously saved cipher key that was previously derived by the test program, will be more easily detected during the run of the test program that uses the previously saved cipher key, rather than re-deriving the cipher key from information derived from the corrupted cipher key in the system space. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of mainframe computer system 102, including: mainframe computer 200; communication unit 202; processor set 204 (including first system (sys) space portion 300*a* and first test program (TP) space portion 301*a*); input/output (I/O) interface set 206; memory device 208; persistent storage device 210 (including fourth sys space portion 300*d* and fourth TP space portion 301*d*); first user terminal 212; second user terminal 214; random access memory (RAM) devices 230 (including third sys space portion 300*c* and third TP space portion 301*c*); cache memory device 232 (including second sys space portion 300*b* and second TP space portion 301*b*); and between run key save data store (BRKSDS) 303. In this embodiment, the totality of system space 300 is: (i) made up of first portion 300*a*, second portion 300*b*, third portion 300*d*; and (ii) is shown schematically in FIG. 3A. Alternatively, in some embodiments, the system space may be limited to the portion in the processor(s) set (that is, first portion 300*a*). In this embodiment, the totality of TP space 300 is: (i) made up of first portion 301*a*, second portion 301*b*, third portion 301*d*; and (ii) is shown schematically in FIG. 3B. In some embodiments, the most important part of the TP space will be located in RAM (that is, third portion 301*c*).

Mainframe computer 200 may alternatively take the form of a laptop computer, tablet computer, netbook computer, personal computer (PC), a desktop computer, a personal digital assistant (PDA), a smart phone, or any programmable electronic device. Test program of TP space 301 is a collection of machine readable instructions and/or data that is used to create, manage and control certain software functions that will be discussed in detail, below, in the Example Embodiment sub-section of this Detailed Description section.

In this embodiment, mainframe computer 200 is capable of communicating with other computer sub-systems via a communication network (not shown). This network can be, for example, a local area network (LAN), a wide area network (WAN) such as the Internet, or a combination of the two, and can include wired, wireless, or fiber optic connections. In general, network can be any combination of connections and protocols that will support communications between mainframe computer 200 and client sub-systems.

Mainframe computer system 102 is shown as a block diagram with many double arrows. These double arrows (no separate reference numerals) represent a communications fabric, which provides communications between various components of system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

In this embodiment, at least some portions of the machine logic of the test program of program space 301 are stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

The test program may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with mainframe computer 200. For example, I/O interface set 206 provides a connection to first and second terminals 212, 214. User(s) can interact with the test program through terminals 212, 214. Terminals 212, 214 will typically include devices such as a keyboard, keypad, a touch screen, and/or some other suitable input device. Terminals 212, 214 can also include portable computer-readable storage media such as, for example, thumb drives, portable optical or magnetic disks, and memory cards. Software and data used to practice embodiments of the present invention, for example, the test program can be stored on such portable computer-readable storage media. In these embodiments, the relevant software may (or may not) be loaded, in whole or in part, onto persistent storage device 210 via I/O interface set 206.

Figure 4:
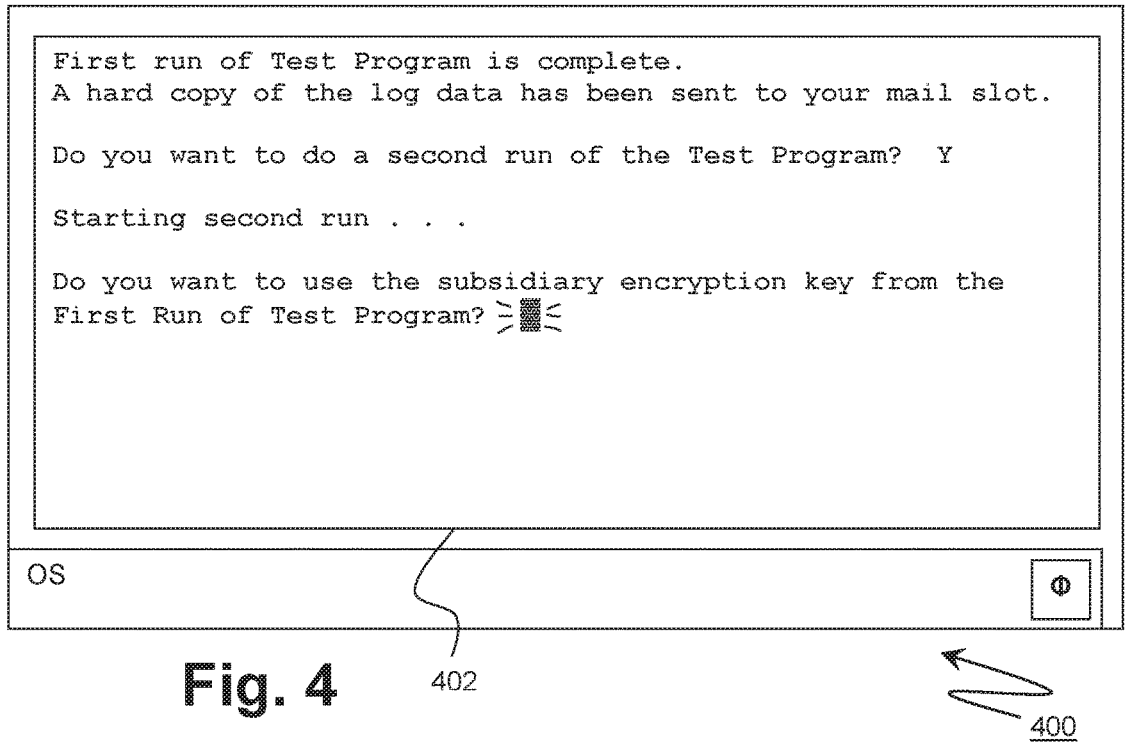
FIG. 4 is a screenshot view generated by the first embodiment system.

The display devices of terminals 212, 214 provides a mechanism to display data to a user and may be, for example, a computer monitor or a smart phone display screen (see, for example, the screenshot of FIG. 4).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
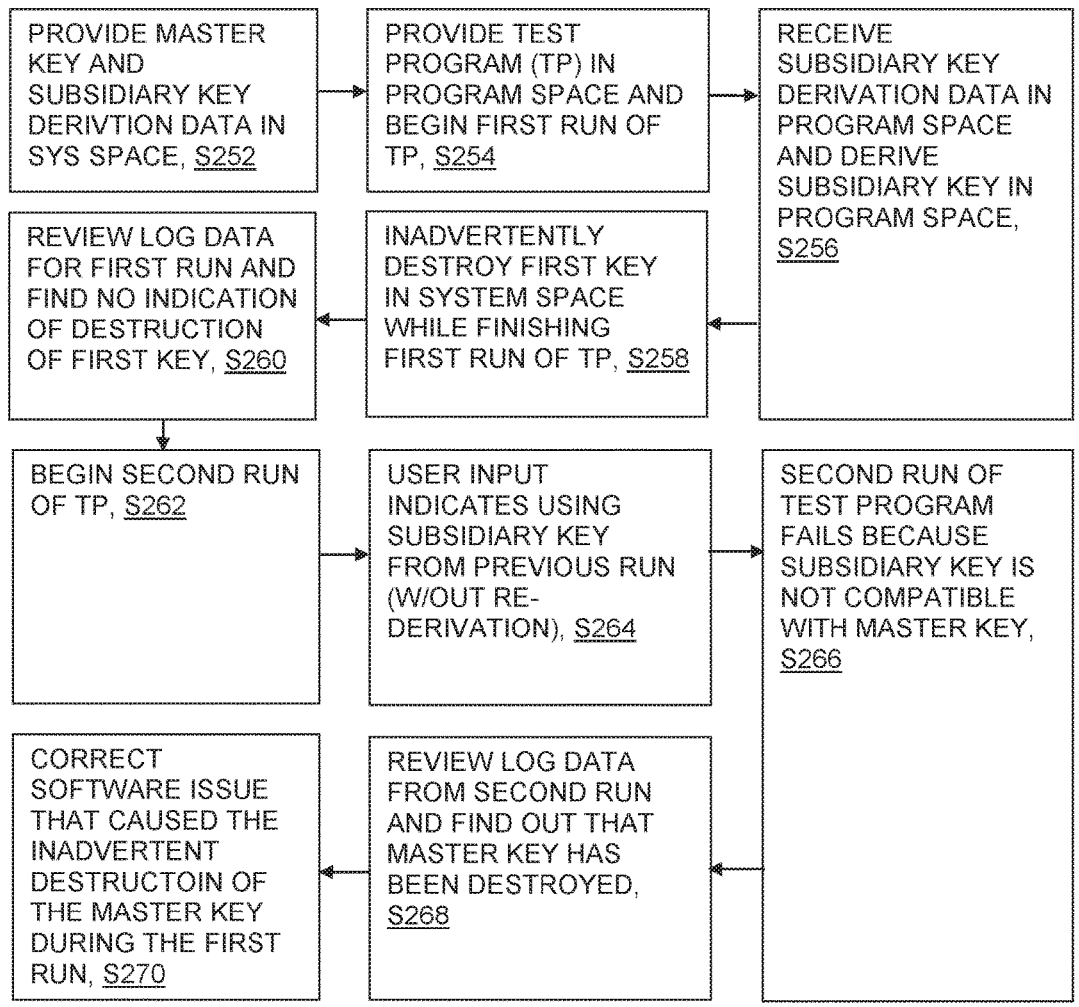
FIG. 2 is a flowchart showing a first embodiment method performed, at least in part, by the first embodiment system.
Figure 3A:
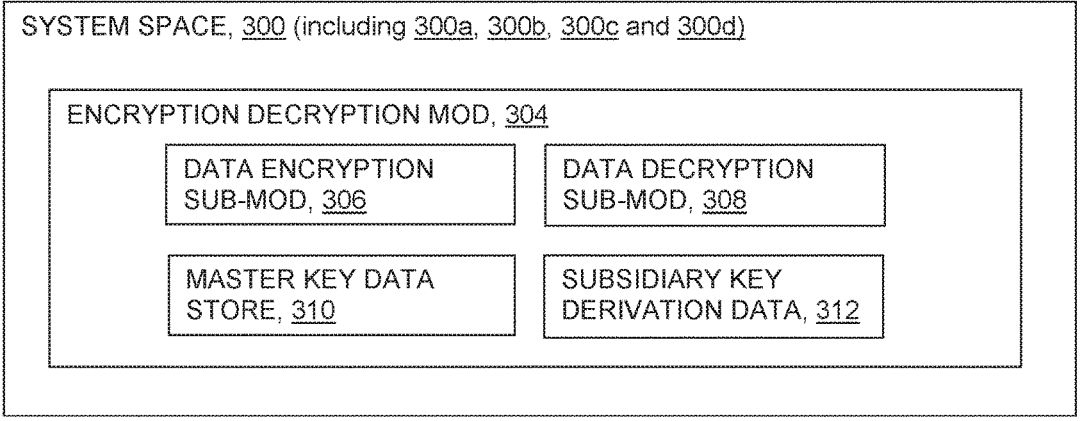
FIGS. 3A and 3B are block diagrams showing a machine logic (for example, software) portions of the first embodiment system.
Figure 3B:
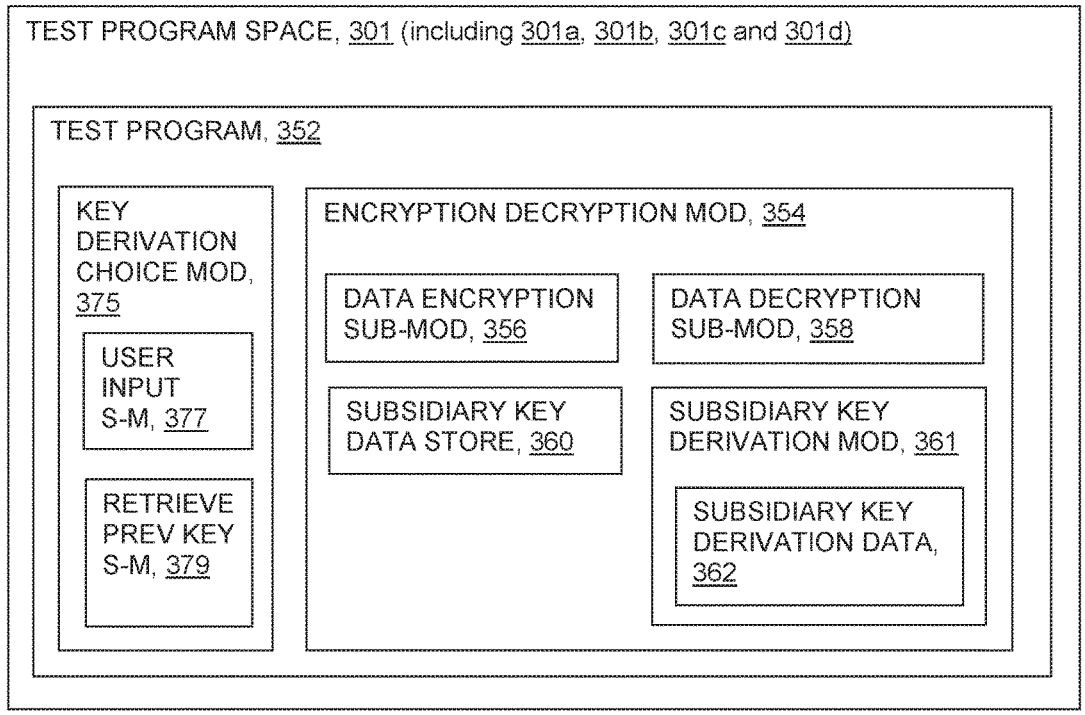

FIG. 2 shows flowchart 250 depicting a method according to the present invention. FIGS. 3A and 3B show programs for performing at least some of the method operations of flowchart 250. This method and associated software will now be discussed, over the course of the following paragraphs, with extensive reference to FIG. 2 (for the method operation blocks) and FIGS. 3A and 3B (for the software blocks).

Processing begins at operation S252, where the machine logic of the computer is installed in system space 300 of mainframe computer 200 as shown in FIGS. 1 and 3A. More specifically, as shown in FIG. 3A, this installation process includes: (i) storing a master key in master key data store 310 in encryption decryption module ("mod") 304 of the system; and (ii) storing subsidiary key derivation data 312 in mod 304 of the system. The master key is used when the system communicates encrypted data with various programs running on mainframe computer, such as the test program to be discussed below. In this example, there is only a single key, but other embodiments may have multiple keys, or multiple sets of cipher key(s) stored for use by the system. For example, in some embodiments, a set of keys stored in the system key may include a clear (that is, unencrypted) master key and an encrypted master key. In this embodiment, for the sake of simplicity, there is only a single clear master key stored in data store 310 of system space 300.

Processing proceeds to operation S254, where test program 352, according to the present embodiment, is loaded into TP space 301 of mainframe computer 200, as shown in FIGS. 1 and 3B. Test program 352 includes: key derivation choice mod 375 and encryption decryption mod 354. Key derivation choice mod includes user input sub-mod 377 and retrieve previous key sub-mod 379. Encryption decryption mod 354 includes data encryption sub-mod 356; data decryption sub-mod 358; subsidiary key data store 360; and subsidiary key derivation sub-mod 361. Also at operation S254, a first run of the test program is commenced in response to user input instructing this to happen.

Processing proceeds to operation S256, where the test program in TP space 352 communicates with the system in the system space to retrieve subsidiary key derivation data 312 from the system space and store it as subsidiary key derivation data 362 in subsidiary key derivation key sub-mod 361. Subsidiary key derivation sub-mod 361 then uses its machine logic to derive and store a subsidiary cipher key in subsidiary key data store 360 in encryption decryption mod 354 in TP space 301. This derivation of a subsidiary key can be performed according to any techniques for deriving subsidiary keys now known, or to be developed in the future. As mentioned above, in some alternative embodiments there will be multiple subsidiary keys, such as encrypted and decrypted versions of a set of subsidiary keys.

Using this subsidiary cipher key, the test program and system can now communicate using encrypted data. More specifically, in this embodiment, communication of encrypted data may include some, or all, of the following operations: (i) data encryption sub-mod 306 in system space 300 uses the encrypted master key stored in master key data store 310 to encrypt data for communication to the TP space as needed during the first run of the test program (which is ongoing during operation S256); (ii) data decryption sub-mod 308 of the system uses the encrypted master key stored in master key data store 310 to decrypt encrypted data received from the TP space as needed during the first run of the test program; (iii) data encryption sub-mod 356 of test program 352 uses the subsidiary cipher key stored in subsidiary key data store 360 to encrypt data to send to the system space as needed during the first run of the test program; and (iv) data decryption sub-mod 356 of test program 352 uses the subsidiary cipher key stored in subsidiary key data store 360 to decrypt data received from the system space as needed during the first run of the test program. Alternatively, in some embodiments, separate keys, of a set of master keys and/or subsidiary keys, may be used for encryption and decryption, respectively.

Processing proceeds to operation S258 where the running of the test program causes inadvertent destruction of the master key stored in master key data store 310 and subsidiary key derivation data 312, of encryption decryption mod 304 of the system in the system space. As discussed, below, this can be caused by a problem encountered during a partitioning of persistent storage 210 (see FIG. 1) operation performed during the first run of the test program. Alternatively, many other causes of destruction of the master key (now known or to be discovered in the future) are possible. However, in this embodiment, the destruction of the master key occurs late in the first run of the test program (which is still ongoing at the time of operation S258). More specifically, it occurs so late that the first run does not make further use of the master key after the inadvertent destruction occurs. Alternatively, in some embodiments, inadvertent destruction of the master key may occur after the first run is technically completed (but still typically occurs as a result of operations that occurred during the first run). This means that the inadvertent destruction of the master key, and its consequent incompatibility with the subsidiary key stored in subsidiary key data store 360 in the program space, will not cause any errors (see definition of "error," below, in the Definitions sub-section) or other anomalies during the first run of the test program.

Processing proceeds to operation S260 where the first run of the test program ends, display data is output indicating the end of the first run, as shown at FIG. 4, first two lines of screenshot 402 shown on display device 400, which display device is part of terminal 212 (see FIG. 1). As indicated, a hard copy of the log data generated by the first run of the test program is output at a printer (not shown) which is part of terminal 212. This output of log data is how programmers determine whether the test program is encountering errors or other anomalies. However, nothing in this log data will indicate the inadvertent destruction of the master key, which occurred at operation S258, because the master key was not used during the part of the test run subsequent to its inadvertent destruction.

As the first run of the test program is ending, machine logic of test program 352 causes the subsidiary key to be copied from subsidiary key data store 360 to BRKSDS 303 in persistent storage 210 (see FIG. 1), outside of TP space 301. In this way, the subsidiary key, as derived during the first run with subsidiary key derivation data 312 before the destruction of that data at operation S258, can be used during a subsequent run of the test program. In this embodiment, BRKSDS 303 is stored outside of TP space 301 because portions of the TP space are cleared when a new run of the test program is started. Alternatively, BRKSDS 303 may be located in some portion of the TP space that is not cleared between runs, or care may be taken not to clear subsidiary key data store and/or subsidiary key derivation data 362 between consecutive runs of the test program. As discussed below, data needed to preserve the subsidiary key (or set of subsidiary keys) between runs may be preserved in an initial parameter block of each encrypted key cryptographic instruction's function. In this embodiment, the subsidiary key is preserved in BRKSDS 303. Alternatively, data used to derive the subsidiary key during the first run could be preserved in order to re-generate the subsidiary key of the first run as part of subsequent runs.

Processing proceeds to operation S262, where, as shown at the third line of screenshot 402 (see FIG. 4), the user of terminal 212 (see FIG. 1) is asked there should be a second run of the test program, and the user responds in the affirmative. Alternatively, machine logic of test program 252 could be programmed to automatically start a second run. As shown at the fourth line of FIG. 4, the second run of the test program starts pursuant to the user input.

Processing proceeds to operation S264, where, as shown at the fifth and sixth lines of screenshot 402, the user is asked whether the subsidiary key from the previous run (that is, the first run in this case) should be used and the user responds in the affirmative because the user wants to make sure that the master key was not destroyed during the first run of the test program. Alternatively, machine logic of test program 252 could be programmed to automatically use the subsidiary key of the previous run on the current run without consulting the user. Also at operation S264, the test key is copied back from BRKSDS 303 to subsidiary key data store 360 (because, as mentioned above, this embodiment clears this space between consecutive runs of the test program). Alternatively, the subsidiary key may be re-derived in the TP space, so long as the correct derivation data of the previous run can be located and used to do this re-derivation (see, definition of "receiving, in the test program space, the set of subsidiary cipher key(s)," below in the Definitions for some possible nuances/alternatives regarding this operation).

Processing proceeds to operation S266 where the second run of the test program begins in earnest. This second run skips any steps that would otherwise re-derive, or re-copy, the subsidiary key from data in the system space (that is, master key data store 310 and/or subsidiary key derivation data 312), which, it should be kept in mind, was corrupted and destroyed toward the end of the first test run. This means that, during this second run of operation S266, the subsidiary key in subsidiary key data store 360 will be incompatible with the master key stored in master key data store 310. This, in turn, means that errors and/or anomalies will be caused during the second test run when encrypted data is attempted to be communicated between the system space and the TP space.

Processing proceeds to operation S268, where log data is output to the user of terminal 212 (see FIG. 1), and the user reviews this log data to discover the errors and/or anomalies that occurred during operation S266. In this embodiment, the log data is reviewed by a human user, but, alternatively, it could be reviewed and analyzed, in whole or in part, by a machine logic based agent user (see definition of "user," below).

Processing proceeds to operation S270, where programmers correct the software, firmware or hardware issue that caused the inadvertent destruction of the master key during the first run. In this embodiment, it only took two runs of the test program to encounter and discover the destruction of the master key. However, given the vagaries of test program runs, it may take repeated runs of the test program to encounter the problem that sometimes causes inadvertent destruction of the master key. According, in some embodiments, the test program may be run multiple times, and may use the subsidiary key from the previous run each time, or only sometimes (at the discretion of the user, or by design of the code that controls repeated running of the test program).

III. Further Comments and/or Embodiments

Some embodiments of the present invention may recognize one, or more, of the following facts, problems, opportunities and/or drawbacks with respect to the current state of the art: (i) sometimes test programs detect incorrect output data returned by the machine for Cryptographic Encrypted Key operations at most once (if any) in an extended test run because the actual machine's output data gets corrupted; (ii) this type of error may occur only sporadically and in many extended test runs the error would not occur; (iii) this type of error cannot reproduce on failing seed, meaning that an external event not related to the failing instruction was causing this type of failure; (iv) only Encrypted Key operations would see the failure which points to a number of alternative possible causes of such a failure, such as the following: (a) the machine's firmware (millicode) somehow picked up a corrupted copy of the machine's secret Cryptographic Wrapping Key, (b) the machine's firmware (millicode) somehow picked up a corrupted copy of the Cryptographic Wrapping Key Mask, (c) the machine's Logical Partition (LPAR) hypervisor somehow picked up a corrupted copy of the Cryptographic Wrapping Key Mask, or (d) the machine's firmware (millicode) somehow picked up one or more corrupted input data pointers.

In response to the items listed in the previous paragraph, a number of different test streams were generated to try to make the problem appear more frequently. For example, the test program was modified to generate only such Encrypted Key operations that would detect failure in the test stream. A loop was added within the test stream to re-execute the same test stream multiple times before exiting the test stream to increase the test stream execution time. In this way, the test program was allowed to spend more time executing the instructions and their functions that have seen the failure to have a better chance of capturing the failure. After many trial and error attempts, the external force that caused the failure were found. Specifically, activation of the LPAR (logical partition) and IPL (Initial Program Load) of the mainframe computer operating system (specifically, a z/OS (z Operating System)), performed after an IML (Initial Machine Load), was causing the error to occur.

The problem may be reproduced by: (i) activating some LPAR partitions and performing IPL of the t/OS (z test Operating System), (ii) starting the test program with the tailored test stream, and (iii) repeatedly activating a new LPAR partition and performing IPL of the mainframe operating system (one at a time) until the test program detected and reported the error. In this way, it was discovered that the machine's firmware (millicode) was destroying the Cryptographic Wrapping Key of another LPAR partition under certain conditions during the activation of the LPAR partition and IPL of z/OS.

Some embodiments of the present invention may include one, or more, of the following features, characteristics, advantages and/or operations: (i) removes drawbacks of the currently conventional test methodology with respect to detection of destruction of output data of cryptographic encrypted key operations; (ii) detects key destruction related errors reliably and quickly; (iii) provides a methodology sufficient to detect cryptographic effective wrapping key destruction, cryptographic data key destruction, and/or destruction of output data of cryptographic encrypted key operations; (iv) detects destruction of output data of cryptographic encrypted key operations that would at most once, or not at all, in extended test runs that use the currently conventional test methodology; (v) gets a new clear/encrypted data key pair from the machine based on the current cryptographic wrapping key using PCKMO (Perform Cryptographic Key Management Operations) instruction; (vi) uses the same clear/encrypted data key pair in many of test streams before getting a new clear/encrypted data key pair; and/or (vii) allows all the test streams with the same clear/encrypted data key pair to see the same problem due to incorrect effective wrapping key use, instead of merely allowing a single test stream to see the problem (which is what happens when the currently conventional test methodology is used because under currently conventional test methodology a new clear/encrypted data key pair is given to each test stream (pass) by the test program).

Some embodiments of the present invention may include one, or more, of the following features, characteristics, advantages and/or operations: (i) a number of different test streams are generated to try to make the problem appear more frequently (for example, a test program that is biased to only generate encrypted key operations would see the failure in the test stream); (ii) add a loop within the test stream to re-execute the same test stream multiple times before exiting the test stream to increase the test stream execution time; (iii) change the test stream's generator to save the initial parameter block of each encrypted key cryptographic instruction's function; (iv) use prerequisite instructions (for example, load instruction to load the pointers to the two parameter blocks and then Move Character or Move Long instruction to copy the parameter block from the saved parameter block to the current parameter block) to reload the initial parameter block of each encrypted key cryptographic instruction's function from the saved area in order to reload the initial parameter block without leaving the test stream and reloading all the initial inputs because every execution of the encrypted key cryptographic instruction's function updates the parameter block with new data; (v) change the test stream's simulator to simulate the output of each encrypted key cryptographic instruction's function only once per stream (no simulation needed for re-execution because the test stream's generator reloads the initial parameter block of each encrypted key cryptographic instruction's function from the saved area which produces the same output every time); (vi) simulating output only once per stream cuts down the time spent by the test stream's simulator; and/or (vii) simulating output only once per stream reduces the error output by eliminating the printing of the re-execution error output because the error output contains the execution results for each instruction including stream re-execution.

There are two common types of cipher keys, DES and AES, and they have different key sizes (64-bits, 128-bits, 192-bits, and 256-bits). These keys are used to encrypt or decrypt the input data. Encipher operation is used to encrypt the clear input data (text) and produce encrypted data (text) (this is also known as the ciphered data (text)) as output; the encrypted data (text) looks nothing like the original clear input data (text) and is not easy to convert it to its original form without knowing the cipher key. Thus, this is a good way to save the data and keep it safe from the hacker for example. To get back the original clear input data (text), decipher operation is used to decrypt the encrypted data (text) and produce the original clear data (text) as output.

Some typical encrypted key cryptographic instructions are as follows: (1) Cipher Message, (2) Cipher Message With Chaining, (3) Compute Message Authentication Code, and (4) Perform Cryptographic Key Management Operations. Some typical encrypted key cryptographic instruction's functions are as follows: (a) Encrypted-DES-64, (b) Encrypted-TDES-128, (c) Encrypted-TDES-192, (d) Encrypted-AES-128, (e) Encrypted-AES-192, and (f) Encrypted-AES-256.

Some embodiments of the present invention may include one, or more, of the following features, characteristics, advantages and/or operations: (i) allow a test program, which has experienced a key destruction related failure, to spend more time executing the instructions and functions affected by the failure in order to have a better chance of capturing the failure; (ii) detect a key destruction related failure every time a set of test code is performed using a single encrypted key cryptographic instruction's function; (iii) to aid the machine's firmware (millicode) to detect the error and clock-stop the machine, a test program saves the simulated output data as well as any the other inputs (like Clear/Encrypted-Data-Key pair) into a save area (like low core storage) for the machine to find and use to check its own answers against the various types of data provided by the test program; and/or (iv) detects the destruction of output data of the Cryptographic Encrypted Key operations.

Some embodiments of the present invention may include one, or more, of the following features, characteristics, advantages and/or operations: (i) a method to detect wrapping key destruction using specialized test cases; (ii) the test stream is altered to re-execute each test stream multiple times before exiting the test stream and produce the same result each time to increase the test stream execution time; (iii) the test stream's results are not re-simulated for the test stream re-execution (that is, simulated only once) to get the output of each encrypted key operation to reduce the time spent outside test stream execution; (iv) the test program saves the output data (the first eight (8) bytes of the simulated output data and the Clear-Data-Key) as well as the input data (Encrypted-Data-Key) into the machine's low core storage area; (v) the machine uses the stored output data and input data to check its own answers; and (vi) the machine performs a clock-stop if the machine's results are different than data provided by the test program.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

User/subscriber/subject: includes, but is not necessarily limited to, the following: (i) a single individual human; (ii) an artificial intelligence entity with sufficient intelligence to act as a user or subscriber; and/or (iii) a group of related users or subscribers.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Error: any error or anomaly regardless of whether there is an assigned error code or the like.

"Receiving, in the test program space, the set of subsidiary cipher key(s)": in some embodiments this receiving may merely involve recognizing subsidiary cipher key(s) (or data for deriving the same) that are already stored in the test program space (for example, RAM allocated to the test program); in other embodiments, the subsidiary cipher key(s) (or data for deriving the same) may be copied from outside of the test program space (but not from the system space).

First run/second run: the "first" run should not be taken to necessarily mean the earliest run of a given testing session with the test program, but only that the first run occurs earlier in time than the second run; the first run does not need to be a run of the test program that occurs immediately before the second run (that is, there may be intermediate runs of the test program between the "first run" and the "second run."

What is claimed is:

1. A computer-implemented method comprising:
running, for a first time, a test program on a computer system, with the test program using instructions and data stored in a test program space of the computer system, with the running, for the first time, of the test program including:
receiving cipher key derivation data from a system space of the computer system,
deriving and storing in the test program space a set of subsidiary cipher key(s) based upon the cipher key derivation data, and
performing a set of data encrypted data communication(s) between the test program space and the system space co-operatively using the set of subsidiary cipher key(s) stored in the test program space and a set of master cipher key(s) stored in the system space;
during or subsequent to the running for the first time of the test program, performing an operation that erroneously destroys the set of master cipher key(s) stored in the system space to yield a set of corrupted master cipher key(s) in the system space;
as the running for the first time is ending, copying the set of subsidiary cipher key(s) from the test program space to a persistent storage that is not part of the test program space; and
subsequent to the performance of the operation that erroneously destroys the set of master key(s) stored in the system space, running, for a second time, the test program on the computer system, with the running, for the second time, of the test program including:

receiving, in the test program space, the set of subsidiary cipher key(s) previously derived and copied to the persistent storage during the running, for the first time, of the test program, encountering an error when attempting to perform a set of data encrypted data communication(s) between the test program space and the system space co-operatively using the set of subsidiary cipher key(s) received in the test program space and the set of corrupted master cipher key(s) stored in the system space, and logging log data indicative of the error.

2. The computer-implemented method of claim 1 wherein the receipt of the set of subsidiary cipher key(s) includes re-derivation of at least one subsidiary cipher key from a set of subsidiary cipher key derivation data set.

3. The computer-implemented method of claim 1 wherein the receipt of the set of subsidiary cipher key(s) does not include re-derivation of any of the subsidiary cipher key(s).

4. The computer-implemented method of claim 1 wherein the set of subsidiary cipher key(s) includes an encrypted subsidiary cipher key and a clear subsidiary cipher key.

5. The computer-implemented method of claim 1 wherein the receipt of the set of subsidiary cipher key(s) includes retrieving an initial parameter block an encrypted key cryptographic instruction's function.

6. The computer-implemented method of claim 1 wherein:

the second running of the test program includes clearing portions of the test program space that include the set of subsidiary cipher key(s); and responsive to the clearing of the subsidiary cipher key(s) from the test program space, using the copied set of subsidiary cipher key(s) from the persistent storage.

\* \* \* \* \*